United States Patent
Schwenk (10) Patent No.: US 11,548,106 B1
(45) Date of Patent: Jan. 10, 2023

(54) AUTOMATED SYSTEM THAT MECHANICALLY EXTRACTS SPARK PLUG TIPS CONTAINING VALUABLE METALS

(71) Applicant: PGM RECOVERY SYSTEMS, INC., Murrieta, CA (US)

(72) Inventor: Edmund Schwenk, Winchester, CA (US)

(73) Assignee: PGM RECOVERY SYSTEMS, INC., Murrieta, CA (US)

( * ) Notice: Subject to any disclaimer, the term of this patent is extended or adjusted under 35 U.S.C. 154(b) by 0 days.

(21) Appl. No.: 17/865,614

(22) Filed: Jul. 15, 2022

(51) Int. Cl.
*B23P 19/00* (2006.01)
*B23P 19/04* (2006.01)

(52) U.S. Cl.
CPC ......... *B23P 19/04* (2013.01); *Y10T 29/53274* (2015.01)

(58) Field of Classification Search
CPC .... B65B 3/04; G05B 13/028; G05B 19/4183; G05B 2219/37351; G05B 2219/40034; G05B 2219/50391; G05B 2219/37537; Y10T 29/49819; Y10T 29/53274; Y10T 29/49815; Y10T 29/49822
USPC ..... 29/762, 426.1, 426.3, 426.4, 564, 564.1, 29/564.3, 770
See application file for complete search history.

(56) References Cited

U.S. PATENT DOCUMENTS

| | | | |
|---|---|---|---|
| 9,702,025 B2 * | 7/2017 | Connelly | C22B 3/3842 |
| 11,051,441 B1 * | 6/2021 | Wieler | H05K 13/0486 |
| 11,072,552 B2 * | 7/2021 | Reijer Picozzi | B01D 29/605 |
| 2014/0191450 A1 * | 7/2014 | Boyman | C22B 4/08 266/200 |

\* cited by examiner

*Primary Examiner* — Thiem D Phan
(74) *Attorney, Agent, or Firm* — Arc IP Law, PC; Joseph J. Mayo

(57) ABSTRACT

An automated, high throughput system that mechanically separates electrode tips from spark plugs to facilitate recovery of platinum group metals in the electrodes. Spark plugs may be fed into the system in bulk and an automated mechanism under computer control executes a sequence of operations to feed plugs in a fixed orientation and at a controlled rate to a robot arm. The robot arm has a gripper that securely holds a set of spark plugs and passes them across a cutting tool to separate tips from the bodies. The gripper has independently actuated finger assemblies that accommodate plugs of varying shapes. A visual inspection system ensures that spark plugs are oriented with the tips facing in the same direction to simplify operation of the robot and the cutting tool. The tips may be processed to extract the contained valuable metals; the remaining bodies may be recycled as iron scrap.

15 Claims, 11 Drawing Sheets

AUTOMATED SYSTEM THAT MECHANICALLY EXTRACTS SPARK PLUG TIPS CONTAINING VALUABLE METALS

BACKGROUND OF THE INVENTION

FIELD OF THE INVENTION

One or more embodiments of the invention are related to the field of metal recycling. More particularly, but not by way of limitation, one or more embodiments of the invention enable an automated system that mechanically extracts spark plug tips containing valuable metals.

DESCRIPTION OF THE RELATED ART

Modern spark plugs frequently contain small amounts of valuable metals in their electrode tips. In particular, platinum group metals such as platinum or iridium may be used in the electrode tips to extend the usable life of the plugs. Because these metals are so valuable, recovering them from used spark plugs is of significant economic interest.

In the recycling of spent automotive spark plugs, the concentration of precious metals of a given waste stream determines the viability for processors. To this end, recyclers seek methods for maximizing the change of concentration at each step. One such technique for the increase of precious metals concertation is for the spark plug electrodes to be removed from the main body of the spark plug, usually by means of abrasive cut off wheel or similar mechanical means. This procedure is time-consuming and labor-intensive, which greatly reduces the economic viability of spark plug recycling. There are no known systems that fully automate the process of mechanically separating the tips of spark plugs bearing valuable metals from the remainder of the spark plug body.

For at least the limitations described above there is a need for an automated system that mechanically extracts spark plug tips containing valuable metals.

BRIEF SUMMARY OF THE INVENTION

One or more embodiments described in the specification are related to an automated system that mechanically extracts spark plug tips containing valuable metals. Embodiments of the invention may enable efficient, high-throughput separation of spark plug tips from spark plug bodies, so that subsequent extraction of metals such as platinum group metals from the tips can be performed economically.

One or more embodiments of the invention may include a vibratory feeder, a camera, a controller, a rejection system, a robot arm, and a cutting tool. The vibratory feeder may be configured to receive spark plugs, each of which has an electrode tip, and to generate a feeder output stream of spark plugs as a single file of spark plugs with their long axes substantially aligned with the flow direction of the feeder output stream, and with the electrode tip of each spark plug at either end of the long axis. The camera may be configured to capture images of the feeder output stream of spark plugs. The controller may be coupled to the camera and it may analyze the camera images to identify misoriented spark plugs in the feeder output stream having the electrode tip not facing a desired direction relative to the flow direction of the feeder output stream. The rejection system may be coupled to the controller, and it may be configured to remove a misoriented spark plug from the feeder output stream and return it to the vibratory feeder. The robot arm may be coupled to the controller. It may have a gripper configured to hold one or more spark plugs. The cutting tool may be configured to cut through each spark plug to separate its electrode tip from the remainder of the spark plug. The controller may be configured to repeatedly perform a sequence of actions that include: commanding the robot arm to grip one or more spark plugs with the gripper; commanding the robot arm to move spark plugs in the gripper across the cutting tool to separate the electrode tip of each spark plug; commanding the robot arm to move the gripper to a discharge area; and commanding the robot arm to release the contents of the gripper into the discharge area.

In one or more embodiments the electrode tips of spark plugs may include one or more platinum group metals. The electrode tip removed by the cutting tool may flow into a platinum group metal recovery stream, which may for example be input into a chemical separation process to extract platinum group metals from the electrode tip.

In one or more embodiments the vibratory feeder may include a vibratory bowl feeder.

One or more embodiments of the invention may further include a metering system coupled to the feeder output stream and to the controller. The metering system may be configured to control the flow rate of the feeder output stream, and to place a fixed number of spark plugs from the feeder output stream into a corresponding fixed number of slots in a carriage. The robot arm may be configured to grip the spark plugs in the carriage and to remove them from the carriage. In one or more embodiments the gripper of the robot arm may have a gripping finger assembly corresponding to each slot of the carriage.

In one or more embodiments the metering system may be configured to repeatedly move the carriage to position each slot of the carriage downstream of the feeder output stream.

In one or more embodiments the metering system may include a clamp with an open position and a closed position, where when the clamp is in the closed position, spark plugs in the feeder output stream are prevented from moving forward in the flow direction.

In one or more embodiments the metering system may be configured to repeatedly place the clamp into the open position, activate the vibratory feeder, place the clamp into the closed position and deactivate the vibratory feeder when a spark plug from the feeder output stream moves towards the carriage, and advance the carriage to position the next slot of the carriage downstream of the feeder output stream when a spark plug enters the slot of the carriage.

One or more embodiments of the invention may have a spark plug depth sensor configured to measure whether a spark plug in the gripper extends from the gripper by more than a threshold amount. This spark plug depth sensor may include a laser.

In one or more embodiments the controller may command the robot arm to position the gripper proximal to the spark plug depth sensor. When the spark plug depth sensor indicates that a spark plug in the gripper extends from the gripper by more than a threshold amount, the controller may command the gripper to release this spark plug into a reprocessing stream.

In one or more embodiments the gripper may have one or more gripping finger assemblies, each configured to close around a portion of a spark plug in the gripper. When a spark plug in the gripper is oriented with the electrode tip facing in the incorrect direction, the corresponding gripping finger assembly may not close fully around the spark plug, allowing the spark plug to hang below the gripper by more than the threshold amount.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION OF THE INVENTION

An automated system that mechanically extracts spark plug tips containing valuable metals will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
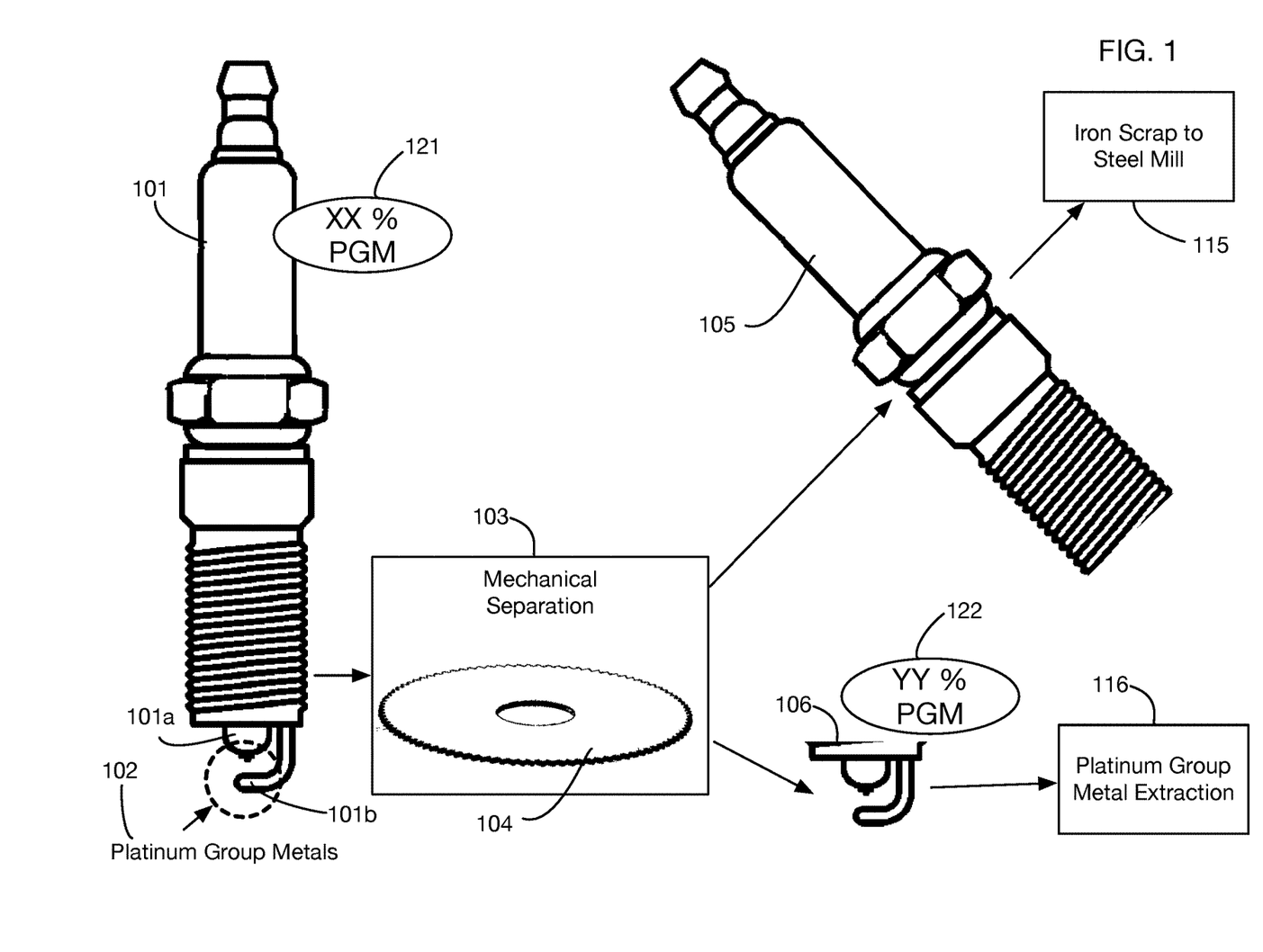
FIG. 1 shows an overview of the role of mechanical separation in the recycling of valuable metals in spark plugs.

FIG. 1 shows an overview of the objective of one or more embodiments of the invention. Specifically, spark plug 101 is to be recycled using one or more embodiments of the invention. The average recoverable platinum group metals (PGM's) from whole spark plugs is typically in the 6-8 mg per plug range and for example 10 mg per plug for Original Equipment Manufacturer (OEM) plugs. Variability is due to many factors. For example, the spark plug may be tipped with PGM on only the center electrode or may contain PGM metal on both the center and side electrode. Also, if the spark plug was manufactured for an OEM application such as fitment at the date of engine manufacture it may have much more PGM metal that if made for replacement after consumer use (typically one-third less PGM for replacement plugs). In addition, spark erosion occurs over the service life of the plugs, which lowers the amount of PGM metal on an end-of-life plug. Based upon our actual production figures, as described above, OEM fitted plugs generally contain 10 mg of PGM, while 20-40% is lost due to spark erosion. As shown in FIG. 1, the tips of the electrodes 101a and 101b (at the gap end) may contain one or more valuable metals, such as PGM's 102. These metals may appear in either or both of the tips 101a and 101b, and possibly in other parts of the spark plug as well. However, a typical concentration 121 of platinum group metals in an entire electrode is very small (for example, 0.0133% by mass). This small concentration may make it uneconomic to separate the platinum group metals from the rest of the electrode using traditional chemical separation processes. To improve the efficiency of the recycling process, a mechanical separation method 103 may be used to physically separate the end of the spark plug containing the electrodes from the rest of the spark plug body. Mechanical separation may use for example a cutting tool 104 such as a blade driven by a mill or a similar mechanism. The tip 106 of the spark plug, which contains the valuable metals, may then be sent to a downstream process 116 to extract these metals from the tip. The concentration 122 of these metals in the tip 106 is considerably higher than the concentration 121 in the complete spark plug; for example, a typical concentration of platinum group metals in tip 106 may be approximately 0.888% by mass. This increase in concentration makes extraction process 116 much more efficient and economically viable. The extraction process 116 may for example use chemical methods (such as acidic solutions), physical methods (heating, cooling, pulverizing), or combinations thereof. The remaining spark plug body 105 may also be recycled in downstream process 115; for example, the body 105 may be sent to a steel mill for recovery of iron scrap.

Figure 2:
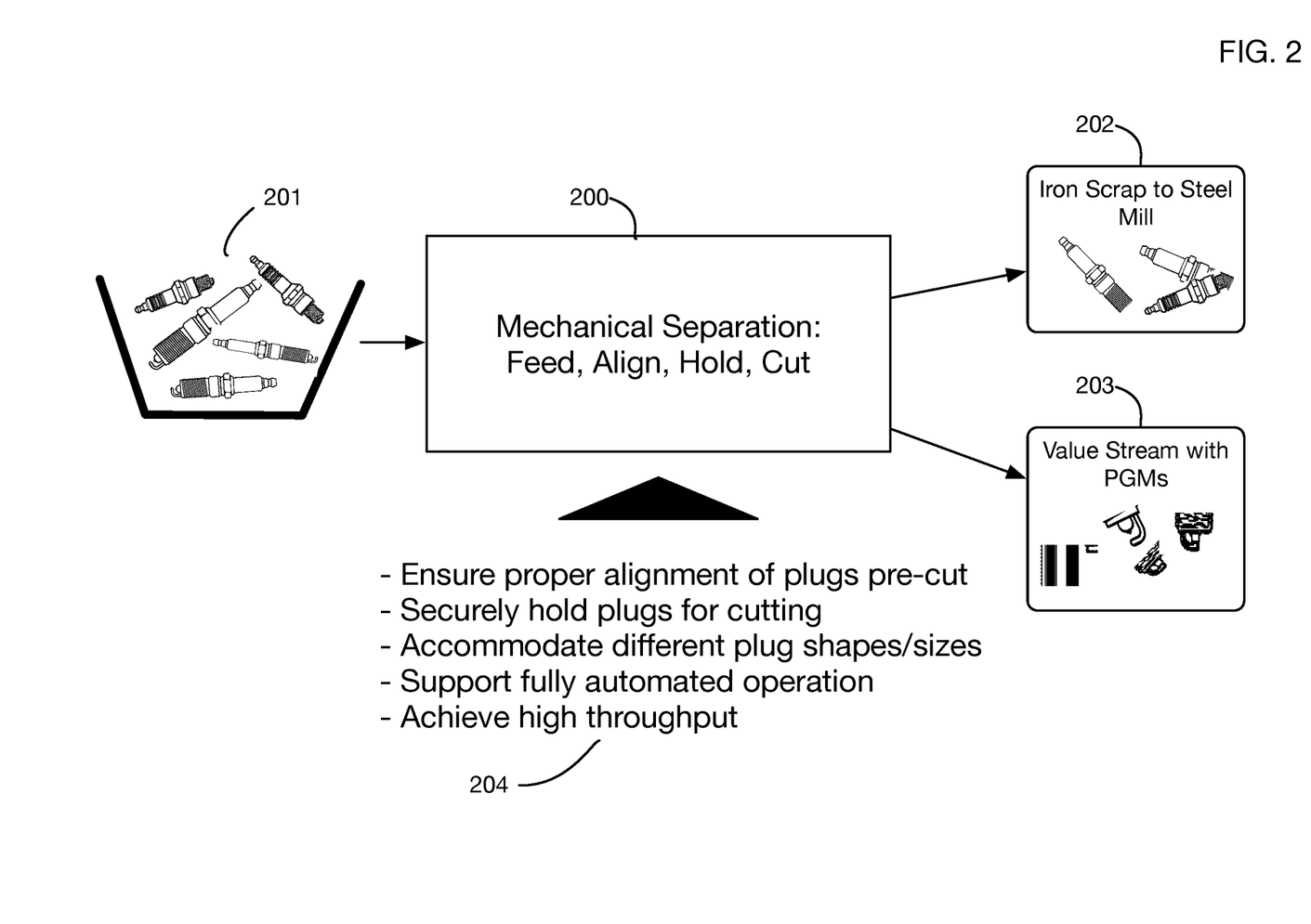
FIG. 2 shows desirable features of a mechanical separation process that separates spark plug tips from the remainder of the spark plug bodies.

Although the process described with respect to FIG. 1 is effective at separating the tip of a spark plug containing valuable metals from the spark plug body, the total amount of valuable metals in an individual spark plug is very small. For the mechanical separation process to be economically viable, it must be highly automated and must process a large number of spark plugs. FIG. 2 shows an overview of a high-volume, automated system for mechanical spark plug separation that is enabled by one or more embodiments of the invention. A stream of spark plugs 201 is input into the system, and an automated mechanical separation system 200 processes these spark plugs to generate two output streams: a value stream 203 with the spark plug tips containing platinum group metals (or other valuable metals), and a scrap stream 202, which may for example be sent to a steel mill for recycling. The value stream 203 may be further processed downstream to remove the valuable metals from the spark plug tips, for example using chemical separation methods.

The automated mechanical separation system 200 may perform several operations on the stream of spark plugs, as described in detail below. These operations may include for example feeding plugs into the system in a controlled stream, aligning plugs so the valuable electrode tips are facing a consistent direction, holding the plugs securely to expose the tips, and cutting off the tips. The system 200 may be configured to meet several objectives 204 that ensure efficient operation. The system may be highly automated and may have a high throughput rate. Because spark plugs vary in their shapes and designs, the system may also accommodate different spark plug geometries.

Figure 3:
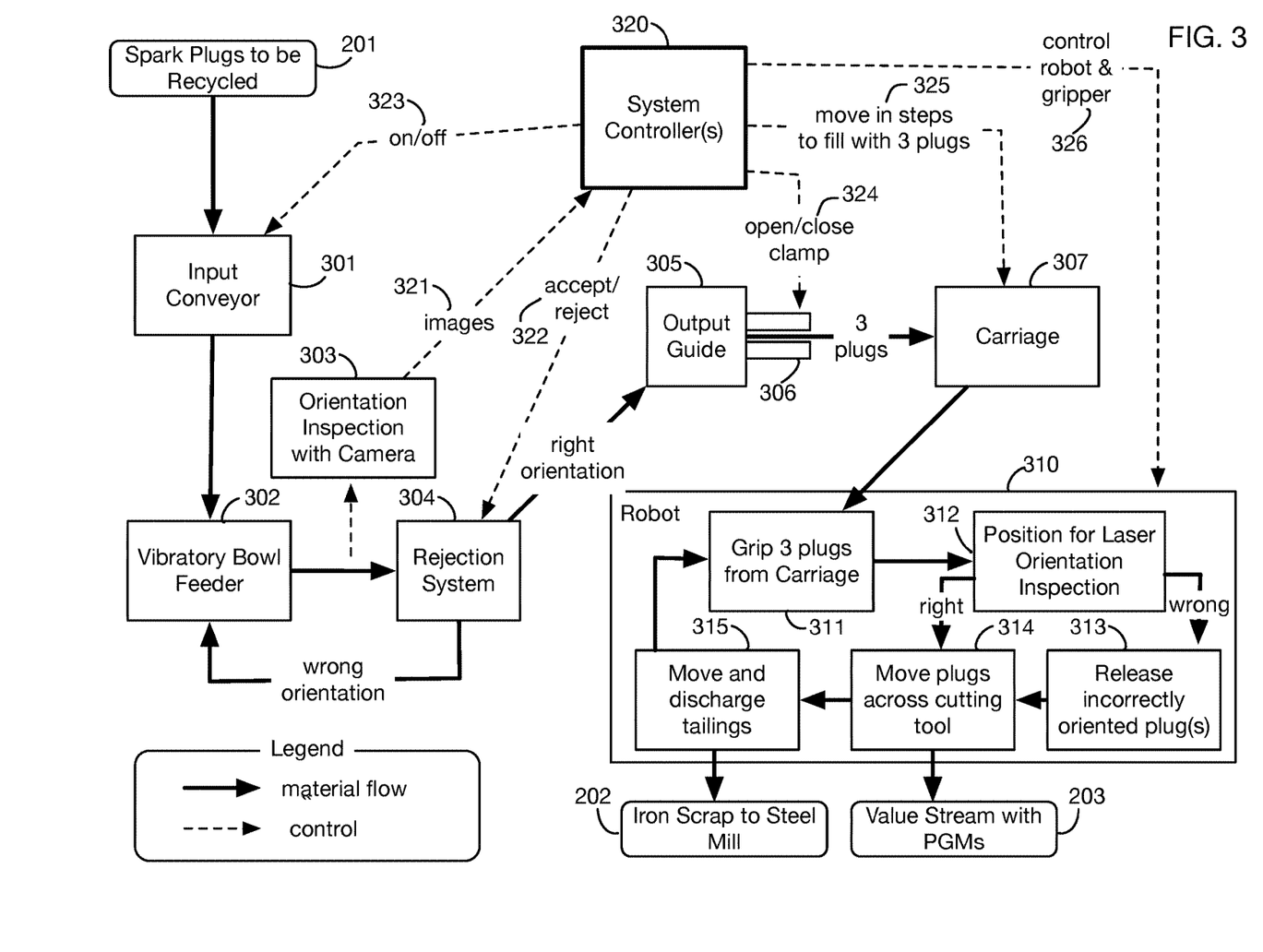
FIG. 3 shows an architectural block diagram of an embodiment of the invention.

FIG. 3 shows a block diagram of an illustrative embodiment of the invention that supports the objectives 204 for efficient, automated mechanical separation. The system is monitored and controlled by a one or more system controllers 320. Controller(s) 320 may be any type or types of processors, including for example, without limitation, a computer, a desktop computer, a server, a laptop computer, a notebook computer, a CPU, a GPU, an ASIC, or a network or combination of any of these types of processors. The controller may be connected by wired or wireless connections to any of the other system components; it may receive data from sensors on or near the components, and it may transmit control commands to the components. (For ease of illustration, not all connections between controller 320 and the other system components are shown in FIG. 3; however, controller 320 may receive data from any sensors in any component and may control any parameters or actions of any component.) In one or more embodiments the controller may be coupled to user interface elements such as a display and keyboard, so that an operator may monitor the system and adjust parameters as needed.

The bulk spark plugs 201 may first enter a small hopper at the charge end of a conveyor 301, such as an infeed belt conveyor. This conveyor 301 may deliver the product to the center of a feeder 302, such as a vibratory bowl feeder. To keep the vibratory bowl feeder 302 at the desired level, the electric motor of the infeed belt conveyor may be controlled by controller 320. For example, controller 320 may monitor a background suppressing diffuse laser sensor trained on the bottom of the vibratory bowl 302 to detect the presence of a single layer of spark plugs as they vibrate past the sensor. The controller may check on the status of the sensor a couple times per second. If the sensor is not blocked by a spark plug the controller may increase a count and compare the count against a set target. When the count reaches the target level a low status may be declared, and the controller may activate the infeed conveyor motor by triggering an open loop vector variable frequency drive to accelerate the conveyor to a set speed for a given time. By adjusting this target level, the conveyor speed and conveyor on time, an operator may set the desired level of material in the vibratory bowl feeder 302 and the controller 320 will maintain the level automatically.

The vibratory bowl feeder 302 relies on proven and well-established mechanical techniques to provide a constant output stream of a single line of plugs to the components downstream. However, while this supply of plugs is produced by the bowl feeder 302 in single file and oriented along its long axis, the tip of the spark plug containing the valuable metals may be at either end of the line of spark plugs. The downstream processing of the line of plugs output by the vibratory bowl feeder may be simplified if the tips to be removed are all oriented in the same direction relative to the direction of flow of the plugs. In the illustrative embodiments illustrated below, it is desirable for spark plugs to be oriented so that the tips all face the direction of flow of the feeder output stream. To achieve this alignment, one or more embodiments may use a machine vison system 303 that uses a camera to inspect the spark plugs as approaches the end of the path in the bowl feeder 302. Images 321 from camera (or cameras) 303 are transmitted to controller 320 for analysis of the spark plug orientation. If a spark plug is oriented correctly, a 50% chance, it is allowed to pass to the output guide 305. If a spark plug is oriented incorrectly, it is rejected back into the center area of the bowl feeder 302 for another chance at orientation. The rejection system 304 is controlled by the controller 320, which transmits commands 322 to the rejection system to reject misoriented spark plugs. An illustrative rejection system 304 may for example utilize an electric solenoid over compressed air system to produce a jet stream of air that forces a misoriented plug back into the center area of the bowl.

In one or more embodiments the controller 320 may analyze images 321 using a pattern tool that compares each new spark plug image to a known image of a typical spark plug in the desired orientation. If the shape of the spark plug image is close enough to the target shape within the set parameters for rotation and tolerance, then the plug is allowed to pass; otherwise, it is rejected using the rejection system 304. The sorting efficiency of this process is less than 100%. However, without this step the spark plug would arrive at the next phase roughly 50% incorrectly oriented. Although one or more embodiments of the invention may utilize additional orientation checks prior to cutting, the up-front orientation check ensures that misoriented spark plugs occur rarely in downstream processes, which greatly improves the flow rate and efficiency of the overall process.

After passing the orientation check, the correctly oriented spark plugs from the feeder output stream may be fed at a controlled rate to a robot 310 that grips the spark plugs firmly and then passes them over a cutting tool to separate the tips from the rest of the spark plug bodies. Control of the flow rate from the vibratory bowl 302 to robot 310 may be performed by a metering subsystem. An illustrative metering subsystem may include an output guide 305 with a clamp 306 that starts and stops spark plug flow, and a carriage 307 that receives one or more spark plugs and presents them to the robot in fixed positions. Upon leaving the bowl feeder 302, the spark plugs that have the desired orientation may pass into an output guide 305; this guide may be for example a linear section coupled to the vibratory bowl feeder. The sparkplugs are propelled into and through this section by a combination of residual vibration and back pressure provided by the supply of material. The side guides of this section may also function as clamping system to prevent forward conveyance when needed. The clamps 306 may close or open based on commands 324 from controller 320. In one or more embodiments the clamps may be pneumatically powered, for example. From the output guide section, spark plugs may be placed one at a time into carriage 307. The carriage may have one or more slots that each receive and hold a spark plug discharged from the output guide 305; in the illustrative embodiment described below the carriage has three slots. The metering system may contain actuators to successively position the slots of the carriage downstream from the output guide, to successively fill the slots with spark plugs. When it is filled with spark plugs, the carriage 307 presents these spark plugs to robot 310 in known orientations, properly oriented and separated from each other, and in a consistent location. Other elements of the metering system include sensors to track the movement and position of spark plugs and of the carriage, and the support structure, guides, brushes and or strips of rubber to act as guides and an aluminum/polymer linear bearing system to guide the movement of the carriage.

An illustrative sequence of actions for the metering system is as follows (using a carriage of three spark plugs for illustration): Controller 320 transmits a command 325 to place the slide carriage 307 in the first position, a command 324 to open the hold back clamp 306, and a command 323 to turn on the vibratory bowl feeder 302 to motive the material flow. The controller monitors the tracking sensor in the guide block and the tracking sensor behind the slide carriage. When a spark plug falls through the guide block, the proximity sensor embedded in it detects the metal in the spark plug body and sends an electric signal to the controller. This triggers controller 320 to send a close command 324 to the guide clamp 306, preventing further feeding momentarily. Once the spark plug being processed reaches the bottom of the slide carriage 307 it is detected by the seconds tracking sensor (behind the slide block). The controller then transmits command 325 to move the slide carriage to the second position an opens the guide clamps to allow additional feeding. In the same way the second and third carriage locations are filled. Once all three carriage locations are filled, the controller opens discharge gates around the carriage so that the gripper of robot 310 can access the spark plugs that are being presented by the metering system.

The gripper at the end of the arm of the processing robot 310 may be specifically configured for this application to allow for variation in spark plug sizes, to retrieve the spark plugs from the metering system, and to hold the threaded end of the spark plugs to be processed with enough force as to not allow the plug to become dislodged while undergoing the cutting forces required to remove the electrodes from the spark plug body at the rotating spindle station. The gripper may have for example three separate gripping finger assemblies for a carriage that holds three spark plugs. Each finger assembly may contain a pivot block (with two pivot pin holes) that attaches to the end of the ram rod, a pair of link arms and a pair of hardened alloy gripping fingers (also required pivot pins). Each gripping finger assembly may be actuated by individual pneumatic rams (also known as air cylinders) to allow each finger assembly to adjust to the individual spark plug threaded body diameter. The air cylinders may activate the gripping fingers through a toggle link mechanism. The toggle link mechanism may increase the force (coming from the ram) that is applied on the threaded body of the spark plug through a rigid link and pin system that changes the angle of the reactionary forces to securely hold the material in place. It was determined graphically that the force multiplier due to the toggle link design ranges from a factor of 1.5 to 4.4 depending on spark plug threaded body diameter. The smaller the diameter the flatter the angle of the reactionary forces increasing the multiplier. Additional force multiplication may be achieved through the lever design of the gripping fingers. The radius measured from the pivot point of the fingers to the pivot point of the links is greater than the radius from the pivot point of the fingers to the centroid of the spark plug. This increases the holding force by an additional factor of 1.3 for a total clamping factor increase of 1.9-5.7 over the initial force from the ram.

Once the metering system has presented a batch of plugs to the robot, the controller 320 transmits a sequence of commands to command the robot through steps 311, 312, 313, 314, and 315. In step 311 the robot gripper takes the spark plugs from the carriage 307. Step 312 then tests the plugs in the gripper to ensure that they have the correct orientation. (Although a previous check for orientation was already performed using camera inspection 303, some misoriented plugs may still pass through this test; in addition, plugs may occasionally become misoriented as they flow from the output guide to the robot gripper.) The orientation test 312 may for example use a spark plug depth sensor that measures the depth of the spark plugs in the gripper. In one or more embodiments this depth sensor may be a fixed position background suppressing laser sensor, and the gripper may be moved to a fixed relative position proximal to this sensor to measure whether any of the spark plugs in the robot gripper extend beyond the gripper by an amount that is more than an expected threshold amount. This process may for example take advantage of the fact the top insulator of a spark plug is generally a smaller diameter and longer axial length than the threaded body section of the spark plug. If this small diameter is under the minimum diameter that can be successfully griped/clamped by the gripping finger assemblies, then any plug that is presented in an upside-down orientation will hang down (due to gravity) lower than the level of the threaded end of any of the three spark plugs that happened to be presented properly. The system may exploit this phenomenon by presenting the gripper containing the spark lugs to the fixed laser beam in such a way that, if all three finger grippers are loaded correctly, the lowest component of the threaded end (usually the ground electrode) will hover above the laser beam and not break the beam causing no signal from the sensor to be sent to the controller. The controller monitors this signal. If the beam is unbroken, no signal will be detected, and the controller determines the tool is loaded correctly and proceeds along its cutting path. On the other hand, if the beam is broken by a misloaded spark plug (usually by the terminal nut at the end of the top insulator), a signal will be detected from the fixed laser and the controller determines that at least one gripping position of the tool is misloaded. This triggers step 313 where the controller repositions the robots end of arm tool so that each finger assembly can be checked individually. Because each air cylinder is activated by a unique electricity over compressed air solenoid valve the controller release the offending spark plug into a reclaim pail for reprocessing without releasing any of the properly loaded spark plugs. Once this process has occurred, if any of the three finger assemblies are still holding spark plugs then the controller commands the robot to execute step 314 to begin move along its cutting path. After the robot has advanced through the cutting hood what remains of the spark plug bodies (tailings) are released in step 315 onto a discharge conveyor that carries the tailings out of the robotic work cell where they can be collected for disposal or additional waste processing.

An illustrative cutting tool that may be use in one or more embodiments is a belt driven super precision milling spindle deployed with draw bar and number 30 taper tool holder along with custom tool holder assembly that is capable of holding common slitting saws or common cut off disks. This spindle assembly may be for example belt driven by a one horse power, three phase, 3600 rpm motor (when at 60 Hz) energized by a variable frequency drive so that the angular velocity of the cutting tool can be adjusted by the operator. A speed increase may be achieved in the belt drive by the mounting of a larger pitch diameter belt sheeve on the motor shaft (7.6 inch) than on the driven spindle shaft (3 inch). This arrangement provides approximately 9,120 revolutions per minute at the tool head when operated at 60 Hz. However, the use of the variable frequency drive allows for speeds in excess of 12,000 rpms so that the system operators can set the best cutting speed appropriate for the various material being processed and used in the tooling. This rigidly fixed cutting spindle may be shrouded on all side by a mild steel dust hood with the exception of cutouts to allow the gripper containing the spark plugs to enter the hood and exit as the robot moves through its programed cutting path. The cutting path taken by the robot may be governed by a series of 3-dimensional location targets (known as robtargets) in conjunction with a couple of variables used as offsets. The offsets are numbers representing millimeter dimensions stored in the memory of the robot controller and can be accessed by the operators in case there is a need for adjustments. The ideal cutting path for the robot to take will completely cut across the spark plug fully removing the center electrode as well as the ground electrode. By adjusting the offsets when needed the operator is empowered to account for any changes in tooling and waste stream material. With this the robot advances the material through the cutting tooling removing the valuable electrodes from the spark plug, collecting these electrodes in the receptacle located under the cutting hood. Some of the value stream is given off in the form of dust which may also be collected for environmental reasons. To assure this dust is collected an attachment to the cutting hood may be included to allow for the integration of a dust collector hose/duct so that the dust is drawn directly from the cutting process.

Figure 4:
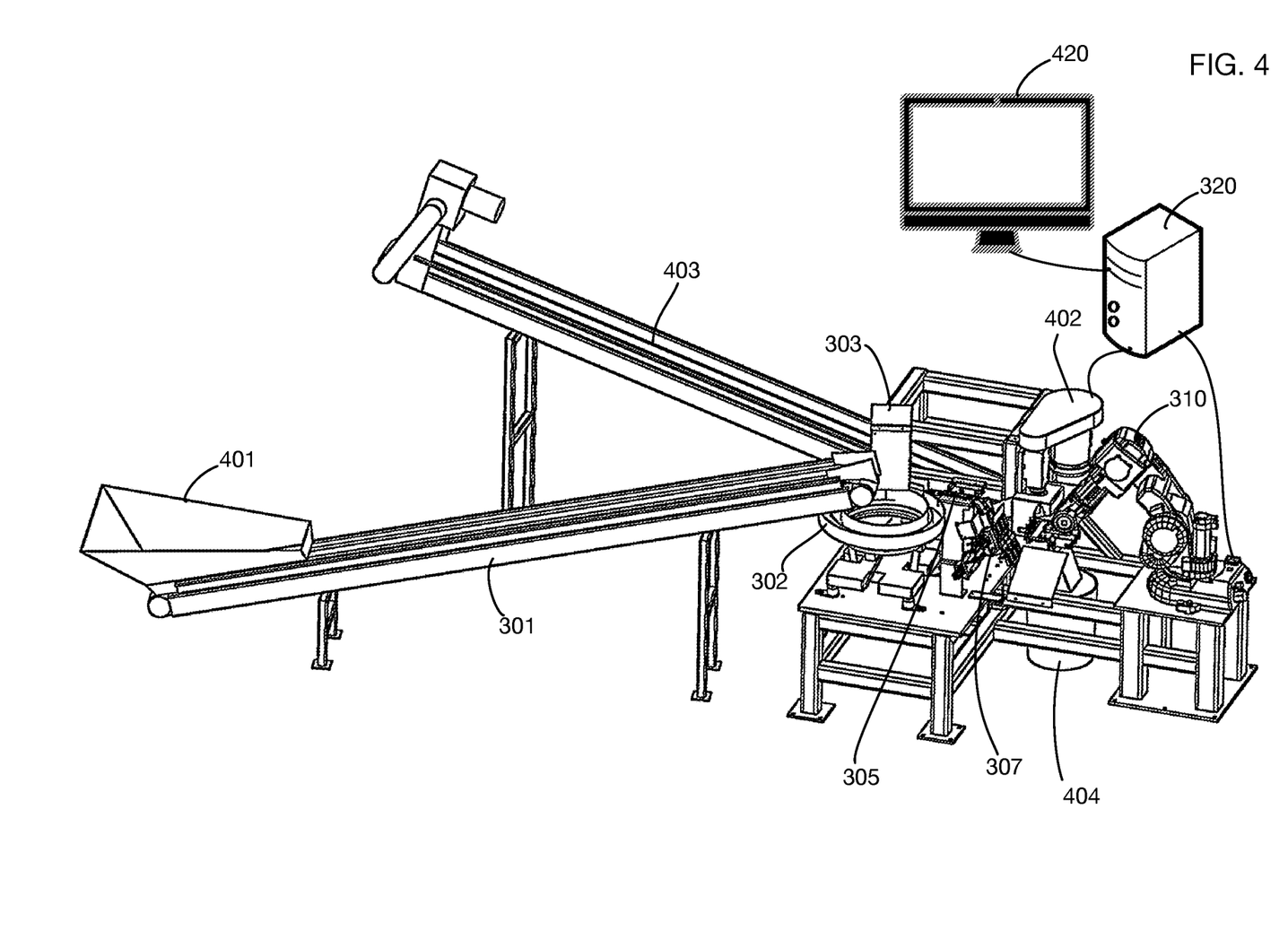
FIG. 4 shows a diagram of illustrative components that implement the process shown in FIG. 3.

FIGS. 4 through 11 show illustrative components of an embodiment of system described with respect to FIG. 3. These components are illustrative; one or more embodiments of the invention may use other components or additional components to perform the operations described in FIG. 3. FIG. 4 shows an overview of a complete system that incorporates all of the elements described in FIG. 3. The system controller 320 is a computer that is connected to all actuators and sensors of the system components. A display 420 is attached to computer 320 for an operator to monitor and adjust the process. The logic and action sequences described above are stored as software programs in controller 320.

Spark plugs to be recycled enter hopper 401 and are carried on input conveyor 301 to vibratory bowl feeder 302. Camera system 303 (shown in FIG. 4 as an enclosure that contains a camera) inspects the orientation of spark plugs exiting the vibratory bowl feeder. Correctly oriented plugs flow to output guide 305, and then into carriage 307. Robot arm 310 obtains spark plugs from carriage 307 and passes them across cutting tool 402. The removed spark plug tips fall into collection container 404. The robot arm then releases the tailings in a discharge area onto output conveyor belt 403.

Figure 5:
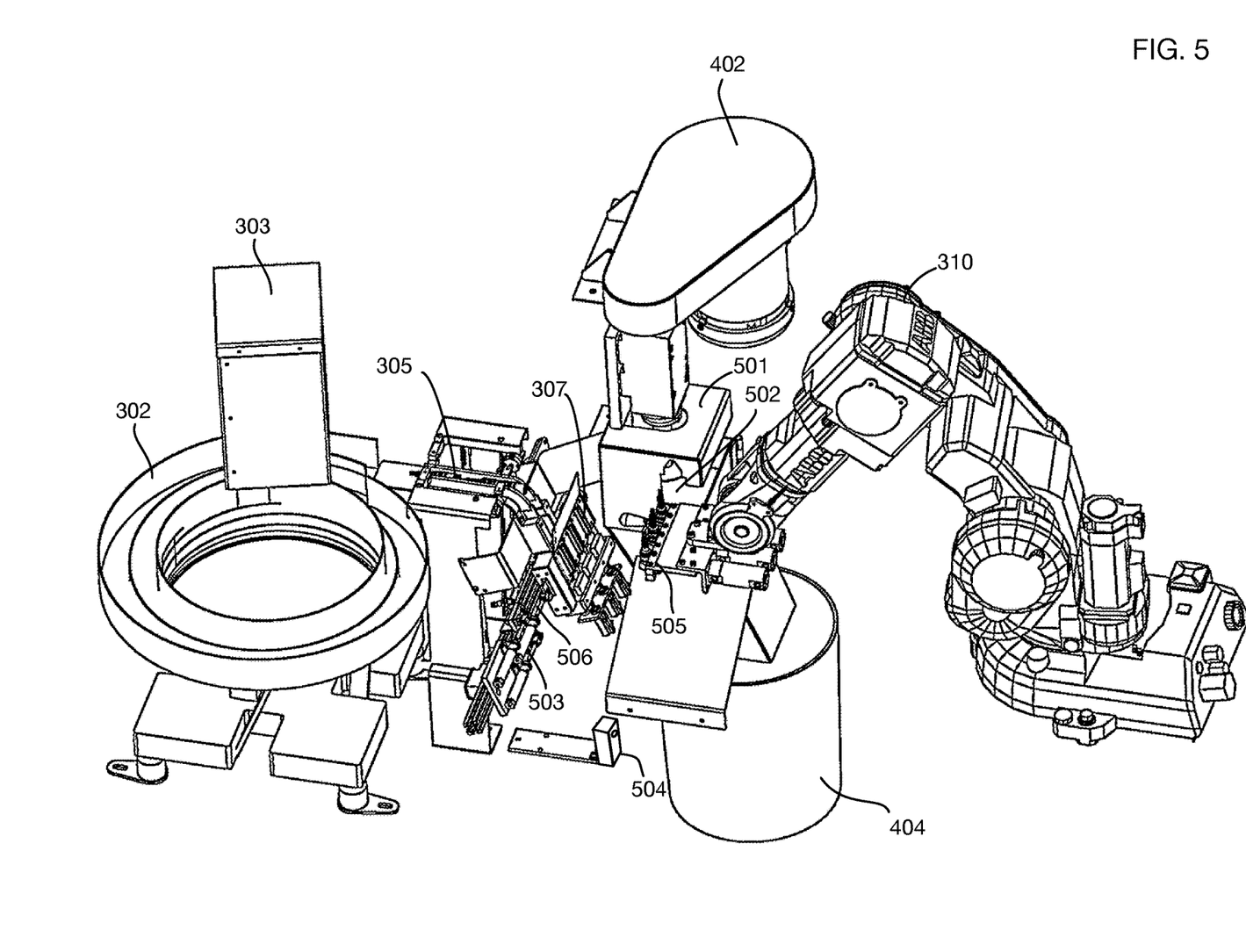
FIG. 5 shows a closeup view of several components of the system of FIG. 4.

FIG. 5 shows a closer view of selected components of the system of FIG. 4. Carriage 307 moves laterally along linear bearings 506 to position each of its slots under the path from output guide 305; it may be moved by actuators such as piston 503. This figure also shows laser 504 which may be used to check the orientation of plugs in the robot gripper. The housing 501 around the cutting tool blade has a cutout 502 through which the robot gripper 505 and the contained spark plugs pass for removal of the spark plug tips by the cutting blade.

Figure 6:
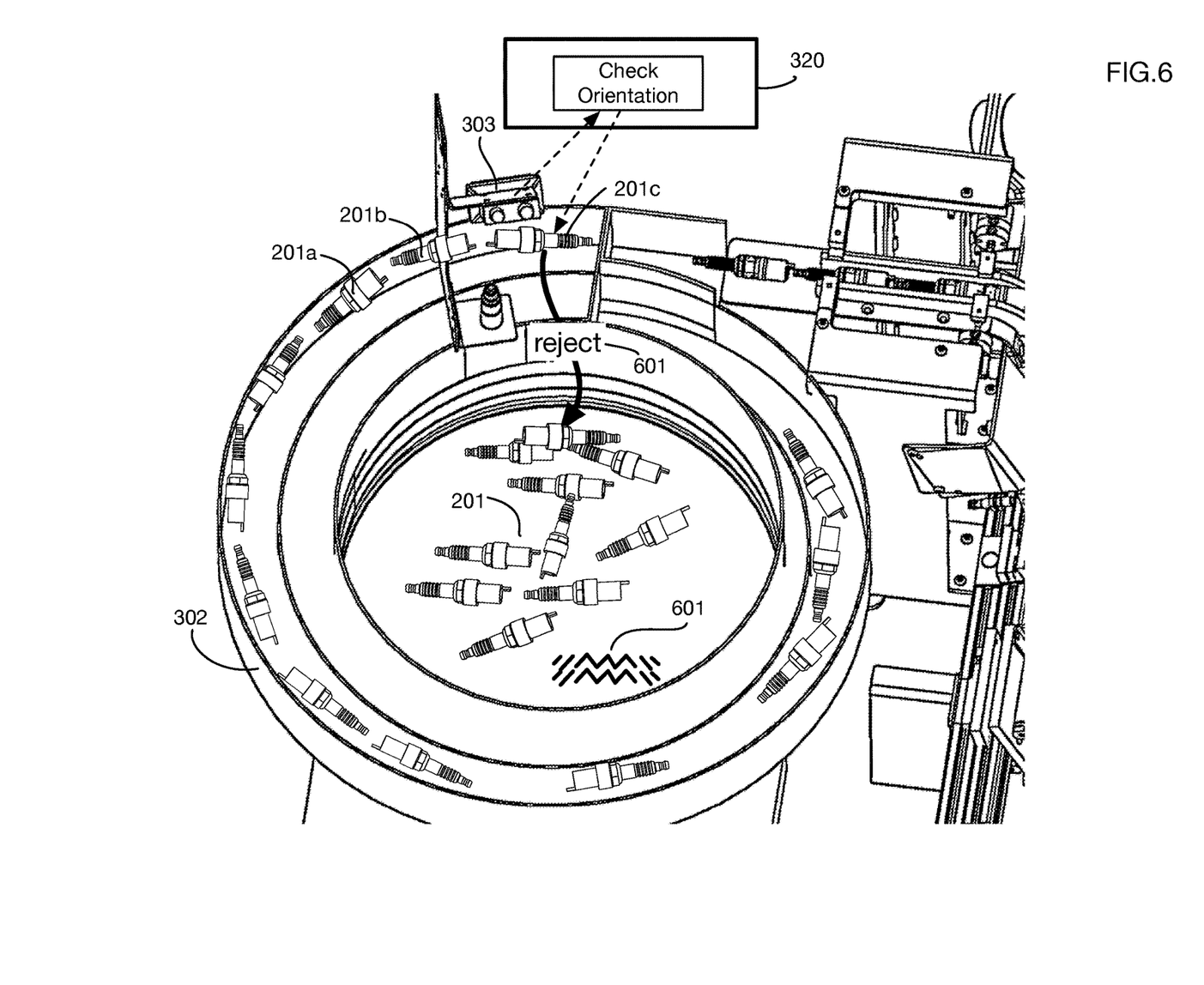
FIG. 6 shows an illustrative vibratory bowl feeder that may be used in one or more embodiments of the invention, along with an inspection system that ensures that spark plugs are correctly oriented before passing them to the later stages of the system.

FIG. 6 shows vibratory bowl feeder 302 in operation, with spark plugs 201 fed into the center of the bowl. Vibration 601 causes the plugs to move to the edge of the bowl and to circulate clockwise, with spark plugs aligning on their long axis against the outer edge of the feeder output path leading from the bowl. As described above, although the plugs are aligned along their long axes, the orientation of the plugs is arbitrary, with some plugs such as 201a and 201b correctly oriented with the tips facing the flow direction, and other plugs such as 201c incorrectly oriented with the tips facing away from the flow direction. Camera 303 (shown here with the enclosure removed) observes the plugs as they exit the bowl and transmits images to controller 320. Incorrectly oriented plugs such as plug 201c result in a rejection 601 that moves these plugs back into the center of the vibratory bowl feeder 302.

Figure 7:
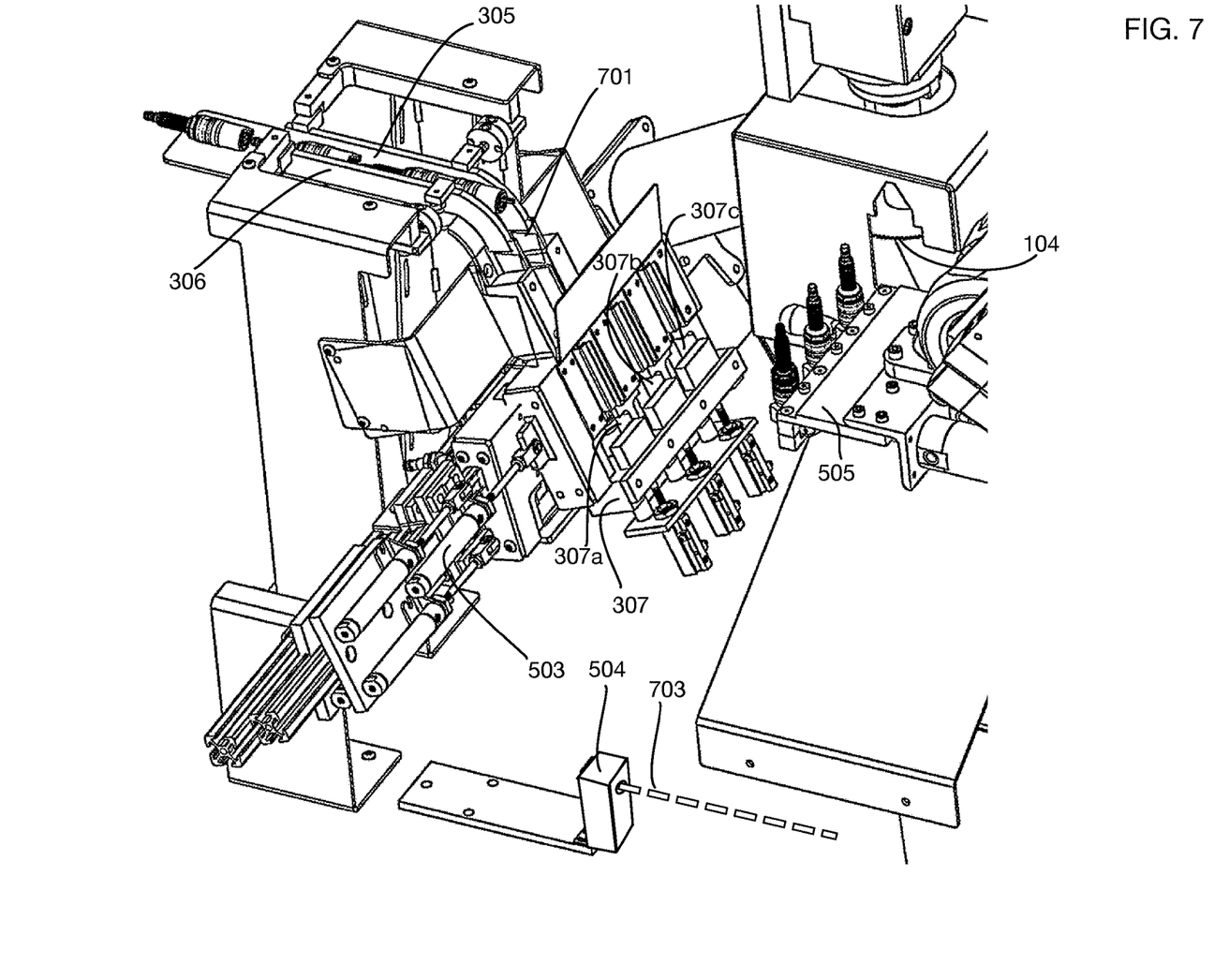
FIG. 7 shows an illustrative metering system that may be used in one or more embodiments of the invention, which controls the flow of spark plugs into the robotic cutting process.

FIG. 7 shows details of the metering subsystem of the system of FIG. 4. Output guide 305 is a linear channel that receives plugs from the vibratory bowl feeder after the alignment check. The walls of the output guide function as clamp 306 that can be opened to feed plugs to the carriage, or closed to prevent plug flow. Carriage 307 has three slots 307a, 307b, and 307c that receive spark plugs. Actuators such as piston 503 move the carriage to successively position these three slots under chute 701 below the output guide 305. FIG. 7 also shows robot gripper 505 with spark plugs received from carriage 307; the robot will move the gripper towards laser 504 so that beam 704 can test the alignment of the plugs in the gripper's finger assemblies.

Figure 8:
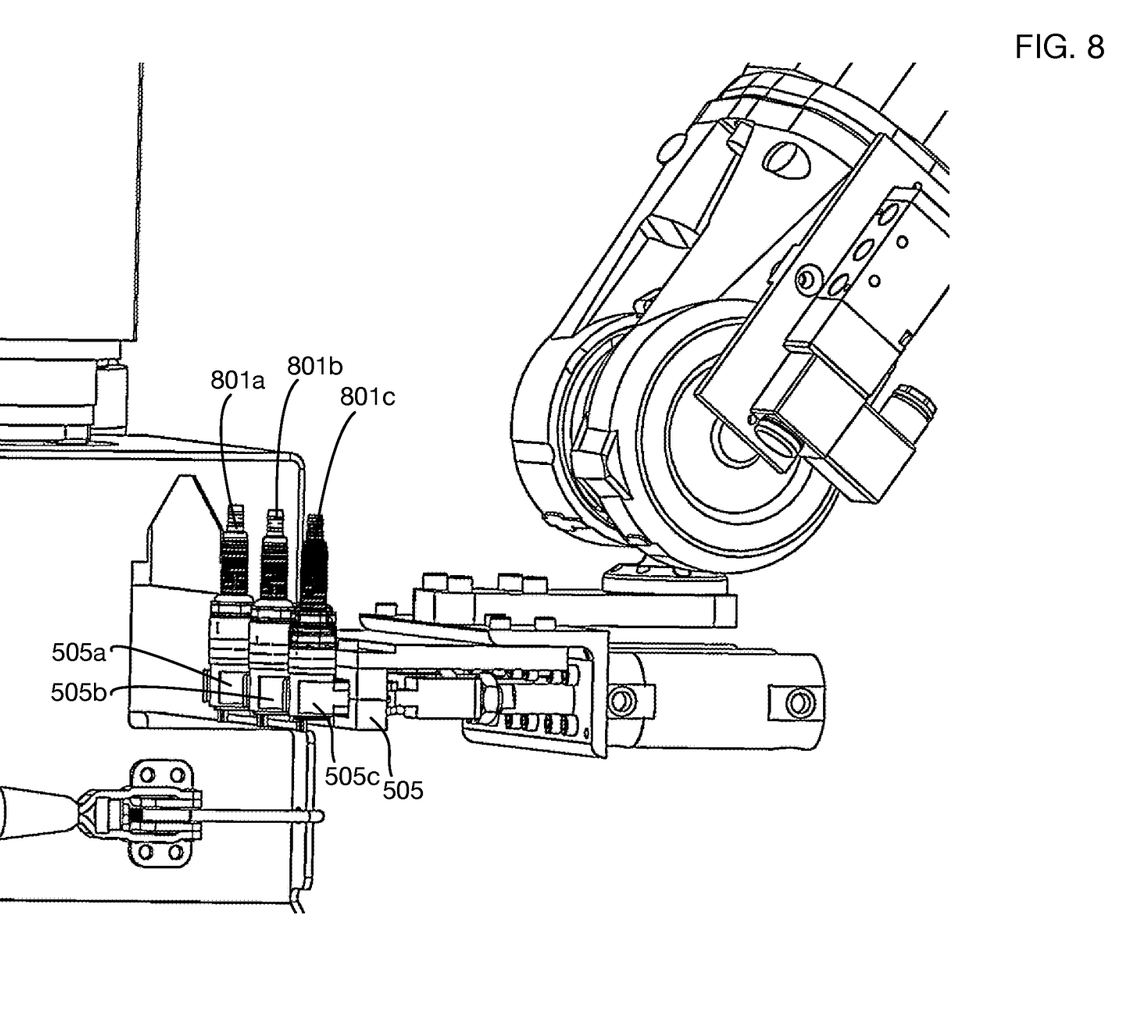
FIG. 8 shows an illustrative robot gripper that may be used in one or more embodiments of the invention to hold spark plugs for cutting.

FIG. 8 shows a detailed view robot gripper 505. This gripper has three separate finger assemblies 505a, 505b, and 505c, each independently actuated, that close around spark plugs 801a, 801b, and 801c, respectively. Because the finger assemblies operate independently, they can accommodate spark plugs of different sizes.

Figure 9:
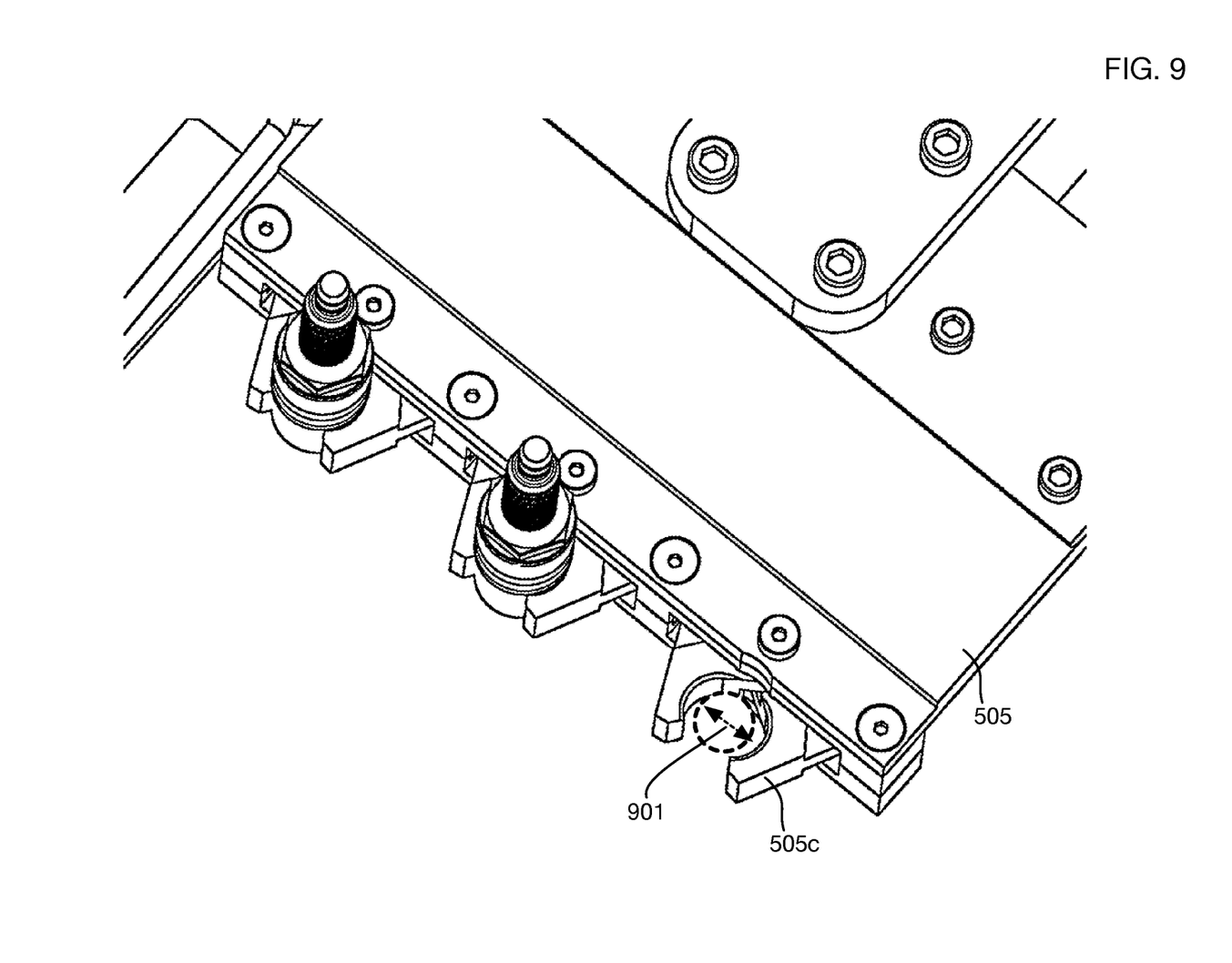
FIG. 9 shows a top view of the gripper of FIG. 8.
Figure 10:
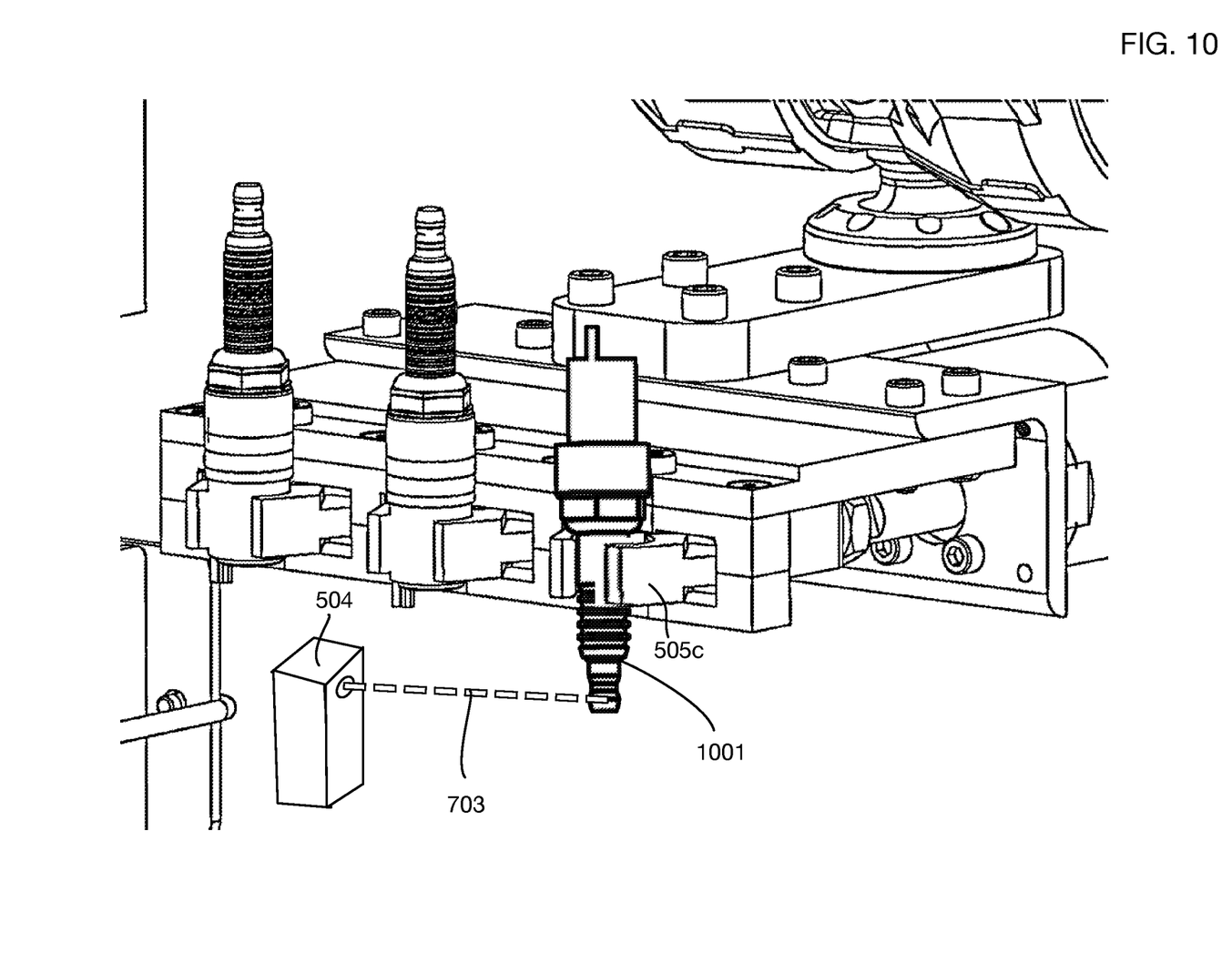
FIG. 10 shows a misoriented spark plug in the gripper of FIG. 8, an illustrates how a laser inspection can detect this misoriented plug.

FIG. 9 shows a top view of robot gripper 505, with finger assembly 505c empty. The finger assembly 505c can open or close to accommodate different diameter spark plugs, but it closes to a minimum diameter 901 that may be larger than a typical diameter of the top insulator part of a spark plug. As shown in FIG. 10, when a plug 1001 is misoriented, the finger assembly around that plug does not close completely, allowing the plug to hang down to a depth below the typical level of the spark plug tips of correctly oriented plugs; laser beam 703 therefore detects the misoriented plug.

Figure 11:
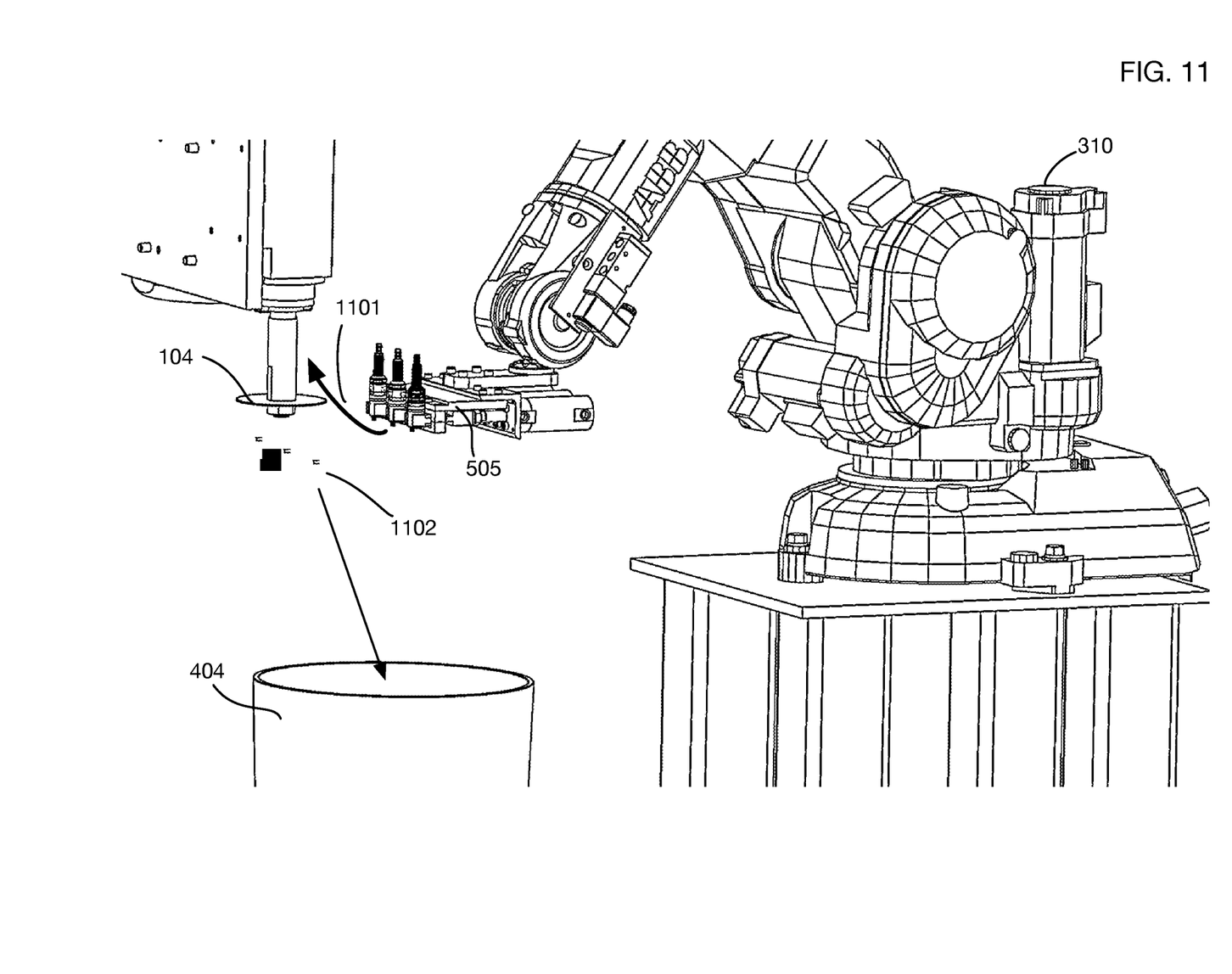
FIG. 11 shows an illustrative cutting blade and an illustrative path taken by a robot to separate electrode tips using this cutting blade.

FIG. 11 shows the cutting path 1101 through which robot arm 310 moves the gripper 505, so that cutting blade 104 (shown here with the protective hood removed) will cut off tips 1102; these tips then fall into collection container 404.

While the invention herein disclosed has been described by means of specific embodiments and applications thereof, numerous modifications and variations could be made thereto by those skilled in the art without departing from the scope of the invention set forth in the claims.

What is claimed is:

1. An automated system that mechanically extracts spark plug tips containing valuable metals, comprising:
   a vibratory feeder configured to
      receive spark plugs, wherein each spark plug of said spark plugs comprises an electrode tip; and
      generate a feeder output stream of said spark plugs as a single file of said spark plugs with a long axis of said spark plugs substantially aligned with a flow direction of said feeder output stream, wherein said electrode tip of each spark plug of said spark plugs in said feeder output stream is at either end of said long axis;
   a camera oriented to capture images of said feeder output stream of said spark plugs;
   a controller coupled to said camera and configured to analyze said images and to identify misoriented spark plugs of said spark plugs in said feeder output stream having said electrode tip not facing a desired direction relative to said flow direction of said feeder output stream;
   a rejection system coupled to said controller and configured to remove said misoriented spark plugs from said feeder output stream and return said misoriented spark plugs to said vibratory feeder;
   a robot arm coupled to said controller comprising a gripper configured to hold one or more spark plugs of said spark plugs;
   a cutting tool configured to cut through each spark plug of said one or more spark plugs to separate said electrode tip from a remainder of each said spark plug;

wherein said controller is further configured to repeatedly
command said robot arm to grip said one or more spark plugs with said gripper;
command said robot arm to move said one or more spark plugs in said gripper across said cutting tool to separate said electrode tip from said each spark plug of said one or more spark plugs;
command said robot arm to move said gripper to a discharge area; and,
command said robot arm to release contents of said gripper into said discharge area.

2. The automated system that mechanically extracts spark plug tips containing valuable metals of claim 1, wherein said electrode tip comprises one or more platinum group metals.

3. The automated system that mechanically extracts spark plug tips containing valuable metals of claim 2, wherein said electrode tip separated from said remainder of each spark plug by said cutting tool flows into a platinum group metal recovery stream.

4. The automated system that mechanically extracts spark plug tips containing valuable metals of claim 3, wherein said platinum group metal recovery stream is input into a chemical separation process to extract said one or more platinum group metals from said electrode tip.

5. The automated system that mechanically extracts spark plug tips containing valuable metals of claim 1, wherein said vibratory feeder comprises a vibratory bowl feeder.

6. The automated system that mechanically extracts spark plug tips containing valuable metals of claim 1, further comprising a metering system coupled to said feeder output stream and to said controller, wherein
said metering system is configured to
control a flow rate of said feeder output stream; and
place a fixed number of spark plugs from said feeder output stream into a corresponding fixed number of slots in a carriage; and,
said robot arm is configured to grip said fixed number of spark plugs in said carriage and to remove said fixed number of spark plugs from said carriage.

7. The automated system that mechanically extracts spark plug tips containing valuable metals of claim 6, wherein said gripper of said robot arm comprises a gripping finger assembly corresponding to each slot of said carriage.

8. The automated system that mechanically extracts spark plug tips containing valuable metals of claim 6, wherein said metering system is configured to repeatedly move said carriage to position each slot of said carriage downstream of said feeder output stream.

9. The automated system that mechanically extracts spark plug tips containing valuable metals of claim 6, wherein
said metering system comprises a clamp with an open position and a closed position, wherein when said clamp is in said closed position, said spark plugs in said feeder output stream are prevented from moving forward in said flow direction.

10. The automated system that mechanically extracts spark plug tips containing valuable metals of claim 9, wherein said metering system is configured to repeatedly
place said clamp into said open position;
activate said vibratory feeder;
when a spark plug from said feeder output stream moves towards said carriage, place said clamp into said closed position; and
deactivate said vibratory feeder; and,
when a spark plug from said feeder output stream enters a slot of said carriage, advance said carriage to position a next slot of said carriage downstream of said feeder output stream.

11. The automated system that mechanically extracts spark plug tips containing valuable metals of claim 1, further comprising a spark plug depth sensor configured to measure whether a spark plug in said gripper extends from said gripper by more than a threshold amount.

12. The automated system that mechanically extracts spark plug tips containing valuable metals of claim 11, wherein said spark plug depth sensor comprises a laser.

13. The automated system that mechanically extracts spark plug tips containing valuable metals of claim 11, wherein said controller is further configured to
command said robot arm to position said gripper proximal to said spark plug depth sensor;
when said spark plug depth sensor indicates that said spark plug in said gripper extends from said gripper by more than said threshold amount, command said gripper to release said spark plug into a reprocessing stream.

14. The automated system that mechanically extracts spark plug tips containing valuable metals of claim 13, wherein
when said spark plug in said gripper is oriented with said electrode tip facing in an incorrect direction, said spark plug in said gripper extends from said gripper by more than said threshold amount.

15. The automated system that mechanically extracts spark plug tips containing valuable metals of claim 14, wherein
said gripper comprises one or more gripping finger assemblies, wherein each gripping finger assembly of said one or more gripping finger assemblies is configured to close around a portion of said spark plug in said gripper; and,
when said spark plug in said gripper is oriented with said electrode tip facing in said incorrect direction, a corresponding gripping finger assembly in said gripper does not close fully around said spark plug allowing said spark plug to hang below said gripper by more than said threshold amount.

* * * * *